United States Patent
Trinh (10) Patent No.: US 9,709,217 B2
(45) Date of Patent: Jul. 18, 2017

(54) X-TRA ARM ITEM HOLDER

(71) Applicant: Jeannie Trinh, Simi Valley, CA (US)

(72) Inventor: Jeannie Trinh, Simi Valley, CA (US)

( * ) Notice: Subject to any disclaimer, the term of this patent is extended or adjusted under 35 U.S.C. 154(b) by 0 days.

(21) Appl. No.: 14/806,590

(22) Filed: Jul. 22, 2015

(65) Prior Publication Data
US 2016/0131305 A1    May 12, 2016

Related U.S. Application Data (60) Provisional application No. 62/027,567, filed on Jul. 22, 2014.

(51) Int. Cl.
| | | |
|---|---|---|
| *E04G 3/00* | (2006.01) | |
| *F16M 13/02* | (2006.01) | |
| *F16M 11/04* | (2006.01) | |
| *F16M 11/20* | (2006.01) | |
| *F16M 11/24* | (2006.01) | |
| *F16M 11/10* | (2006.01) | |

(52) U.S. Cl.
CPC ........ *F16M 13/022* (2013.01); *F16M 11/041* (2013.01); *F16M 11/105* (2013.01); *F16M 11/2014* (2013.01); *F16M 11/2021* (2013.01); *F16M 11/24* (2013.01); *F16M 2200/024* (2013.01)

(58) Field of Classification Search
CPC .... F16M 11/10; F16M 11/24; F16M 11/2014; F16M 11/2092; F16M 11/12; F16M 13/022; F16M 2200/044; F16M 13/00; F16M 11/2021; F16M 11/08; F16M 2200/024; F16M 11/14; F16M 2200/041; F16M 2200/022

USPC ... 248/229.1, 229.11, 229.15, 226.11, 228.1, 248/228.2, 228.6, 230.1, 230.2, 230.6, 248/231.31, 231.71, 313, 316.1, 316.7, 248/316.8, 276.1, 278.1, 284.1, 291.1
See application file for complete search history.

(56) References Cited

U.S. PATENT DOCUMENTS

| | | | | |
|---|---|---|---|---|
| 3,820,752 A | * | 6/1974 | Aram | F16M 11/046 248/284.1 |
| 4,545,555 A | * | 10/1985 | Koch | F16M 11/10 248/280.11 |
| 4,682,749 A | * | 7/1987 | Strater | A47B 27/18 188/166 |
| 4,917,343 A | * | 4/1990 | Wainscott | A47B 23/06 248/284.1 |
| 5,154,390 A | * | 10/1992 | Bain | A47B 97/04 248/284.1 |
| 5,538,214 A | * | 7/1996 | Sinila | A61B 5/04004 248/278.1 |
| 6,378,829 B1 | * | 4/2002 | Strater | F16M 11/10 248/276.1 |
| 6,598,837 B1 | * | 7/2003 | Howard | A61J 9/0638 248/102 |

(Continued)

*Primary Examiner* — Steven Marsh
(74) *Attorney, Agent, or Firm* — Ruth Eure (57) ABSTRACT

An assistive device for holding an object having a mounting clamp for securing the device to a surface, an arm attached to the mounting clamp by means of a first rotatable and lockable joint, a fist arm attached to the first rotatable and lockable joint, a second rotatable and lockable joint, a second arm attached to the second rotatable and lockable joint, an integrated clamp holder mounted to the second am by means of a third rotatable and lockable joint.

18 Claims, 6 Drawing Sheets

(56) References Cited

U.S. PATENT DOCUMENTS

| | | | | |
|---|---|---|---|---|
| 6,896,230 B2 * | 5/2005 | Cvek | ...................... | F16M 11/10 |
| | | | | 248/276.1 |
| 2005/0006542 A1 * | 1/2005 | Henning | ................ | F16C 11/10 |
| | | | | 248/274.1 |
| 2005/0230580 A1 * | 10/2005 | Bryan | ................ | A61G 7/0503 |
| | | | | 248/226.11 |
| 2009/0044655 A1 * | 2/2009 | DeLouis | ................ | B25J 15/04 |
| | | | | 74/490.05 |

* cited by examiner

X-TRA ARM ITEM HOLDER

CLAIM OF PRIORITY

This patent application claims priority under 35 USC 119 (e) (1) from U.S. Provisional Patent Application Ser. No. 62/027,567 filed Jul. 22, 2014, of common inventorship herewith entitled, "X-tra Arm Item Holder," which is incorporated herein by reference as though the same were set forth in its entirety.

FIELD OF THE INVENTION

The present invention pertains to the field of mechanical tools and more specifically to the field of mountable assemblies for holding items.

BACKGROUND OF THE INVENTION

The prior art has put forth several designs for mountable assemblies for holding items. Among these are:

U.S. Pat. No. 6,997,421 to Anne Vandette Reynolds and Liliane Vandette describes an assembly for holding a portable hair dryer which has a handle and a nozzle. The assembly comprises a cradle having upper and lower portions to respectively support the nozzle and handle, a mounting arrangement for securing the assembly to a substrate such as a wall or table and a connecting assembly which permits movement of the cradle in different directions. The assembly permits hands free use of a portable hand held hair dryer.

U.S. Pat. No. 4,712,313 to Carl Gettleman describes a hands free portable hair dryer holder to hold a portable hair dryer while in use, allowing a person to use their two free hands on the hair. A mechanism is built within the holder which automatically swings a hair dryer up and down while in use so as to prevent excessive heat at one spot on the hair.

U.S. Pat. No. 3,041,034 to Leonard A. Wilkinson describes a mechanical linkage and compound brake that comprise a linkage system for supporting such devices as lamps, head rests and mirrors. The supported device is adjustable or maneuverable into a desired position by one hand of the operator which simultaneously releases the compound braking mechanism permitting such adjustment.

None of these prior art references describe the present invention.

SUMMARY OF THE INVENTION

It is an object of the present invention to provide an assistive apparatus or device for holding an object having a mounting clamp for securing the device to a surface, an arm attached to the mounting clamp by means of a first rotatable and lockable joint, a fist arm attached to the first rotatable and lockable joint, a second rotatable and lockable joint, a second arm attached to the second rotatable and lockable joint, an integrated clamp holder mounted to the second am by means of a third rotatable and lockable joint.

DETAILED DESCRIPTION OF THE INVENTION

Inventions are always a product of vision and creativity whether they are world changing inventions like cars and computers or everyday conveniences like pump hairsprays, cordless tools and resealable soda bottles. New inventions like a cell phone change a person's life style, making communication more convenient and accessible virtually anywhere. Other inventions such as a snow scraper and brush combine two already existing inventions into an improved embodiment, reducing clutter in our lives and making a daily winter chores much easier. Often necessity combined with a little creativity is the underlying motivator for an invention. Most inventions fill a relatively small need or perform a specialized limited function. If that need is shared by a sufficient number of consumers, an invention has a great potential for success.

Individuals often find themselves in situations where it is helpful to have an extra hand. Whether a mother attempting to push a baby carriage while simultaneously holding an umbrella over her head, a senior citizen trying to juggle a heavy purse or shopping bag while utilizing a mobility walker or a fisherman needing to secure his own fishing pole while helping his young child bait their hook, there are times when it is nearly impossible to complete necessary tasks with only two hands. Attempting to handle multiple objects with two hands is difficult for extremely dexterous individuals and even more difficult for individuals who suffer limited mobility.

The present invention, hereinafter referred to as the Xtra Arm Item Holder, or simply Xtra Arm, is an assistive apparatus comprised of an adjustable support arm with an integrated clamp holder. The Xtra Arm is constructed to be easily attachable to a variety of surface areas. The Xtra Arm provides users with an extra hand to secure personal goods when engaged in various activities or completing simple tasks. Please refer to the Figures.

The Xtra Arm is manufactured with lightweight yet durable aluminum material and comprised of metal and rubber components. The Xtra Arm 10 is basically an adjustable support arm. The first end 20 of the arm has a heavy duty tension clamp 22 for securing the device to a variety of surfaces. The second end 30 of the arm has a clamp fastener 32 for securing and holding personal items.

Figure 1:
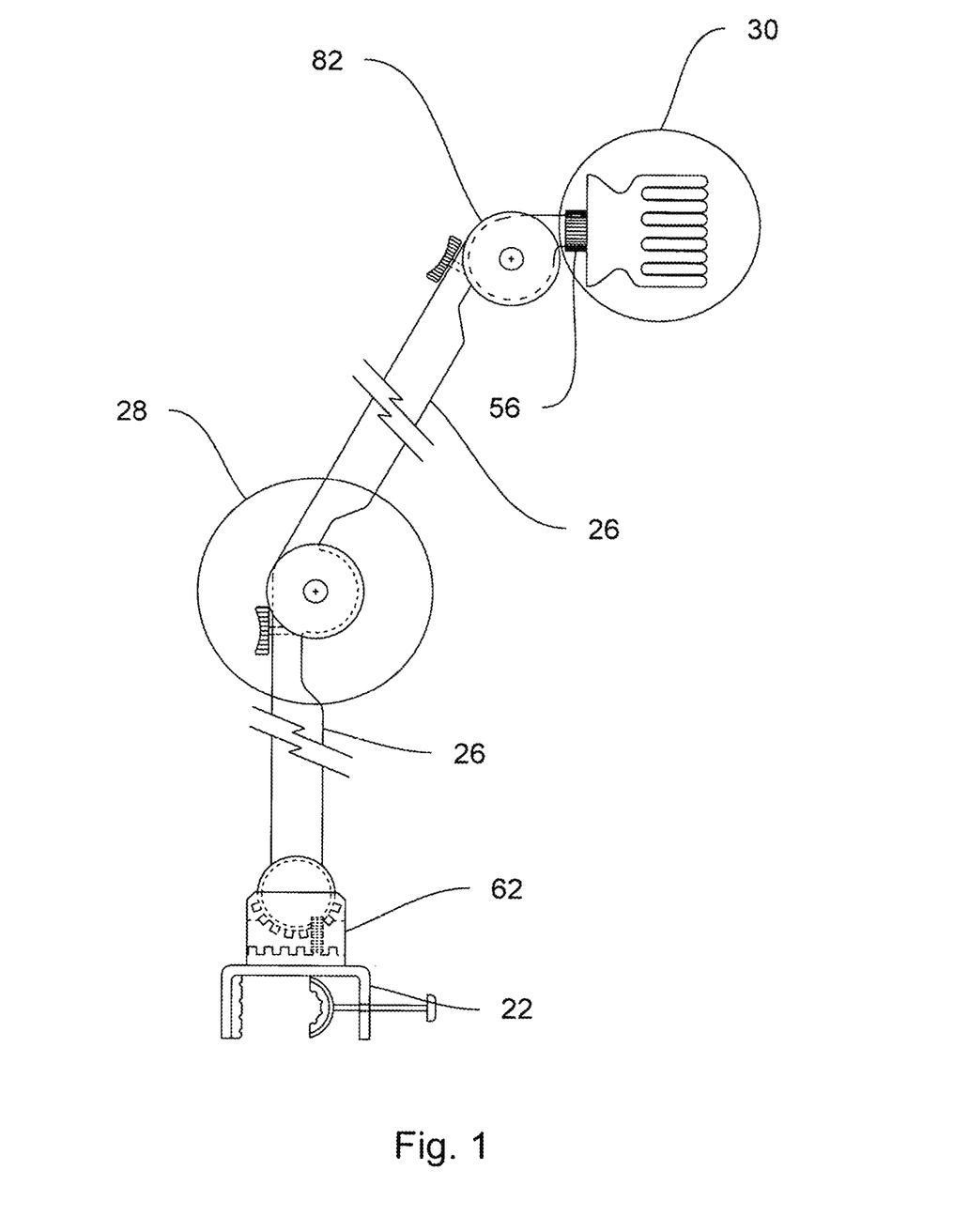
FIG. 1 is an illustrative prototypical diagonal side view showing essential components of the present invention including a top clamp, two arms, an elbow joint, three rotatable locking joints and a bottom clamp.
Figure 2:
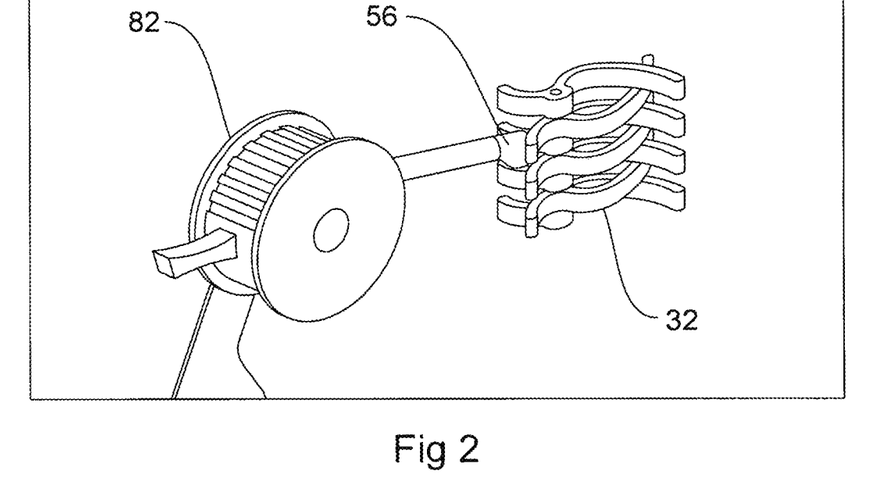
FIG. 2 is an illustrative prototypical close up view of the present invention's grasping arm showing a proximally located rotating collar and a clamp that opens to accommodate an approximately two and one half inch diameter.
Figure 3:
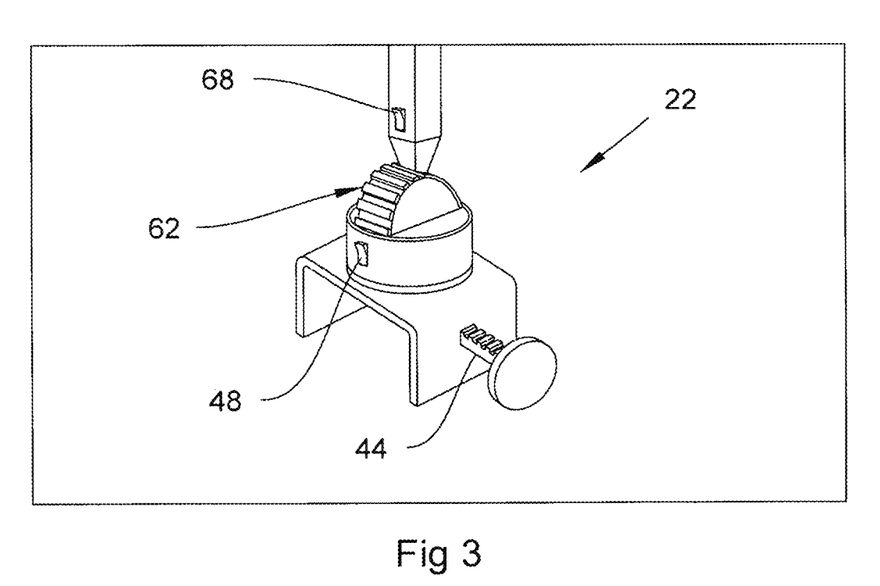
FIG. 3 is an illustrative prototypical close up view showing the present invention's rotatable locking joint that is capable of a one hundred eighty degree rotation forward and backward and a three hundred sixty degree rotation side to side.
Figure 4:
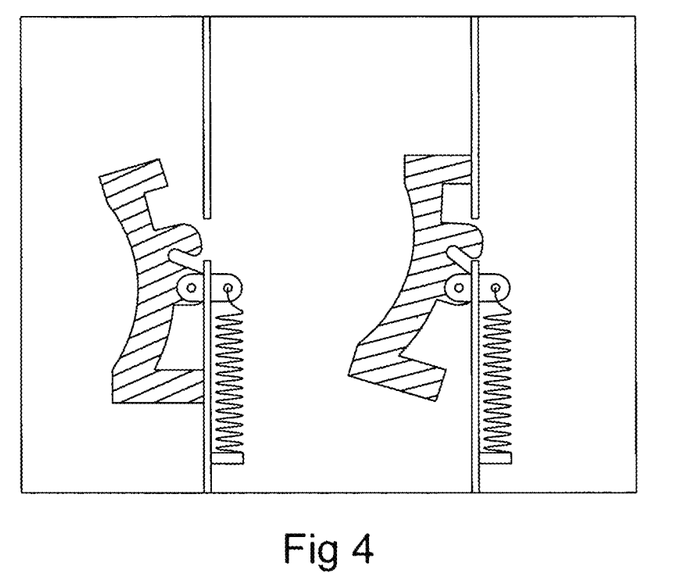
FIG. 4 is an illustrative functional close up drawing showing how the locking latch and release button, which are located on all three rotatable locking joints, are snapped in place and released by pushing on their respective ends.
Figure 5:
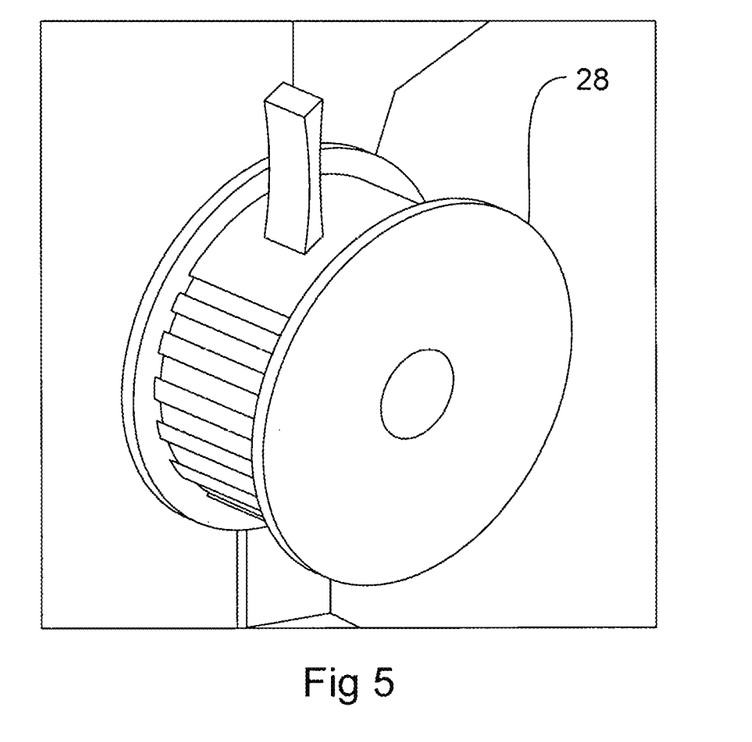
FIG. 5 is an illustrative prototypical close up view showing a locking latch and release button located on a rotatable locking joint.
Figure 6:
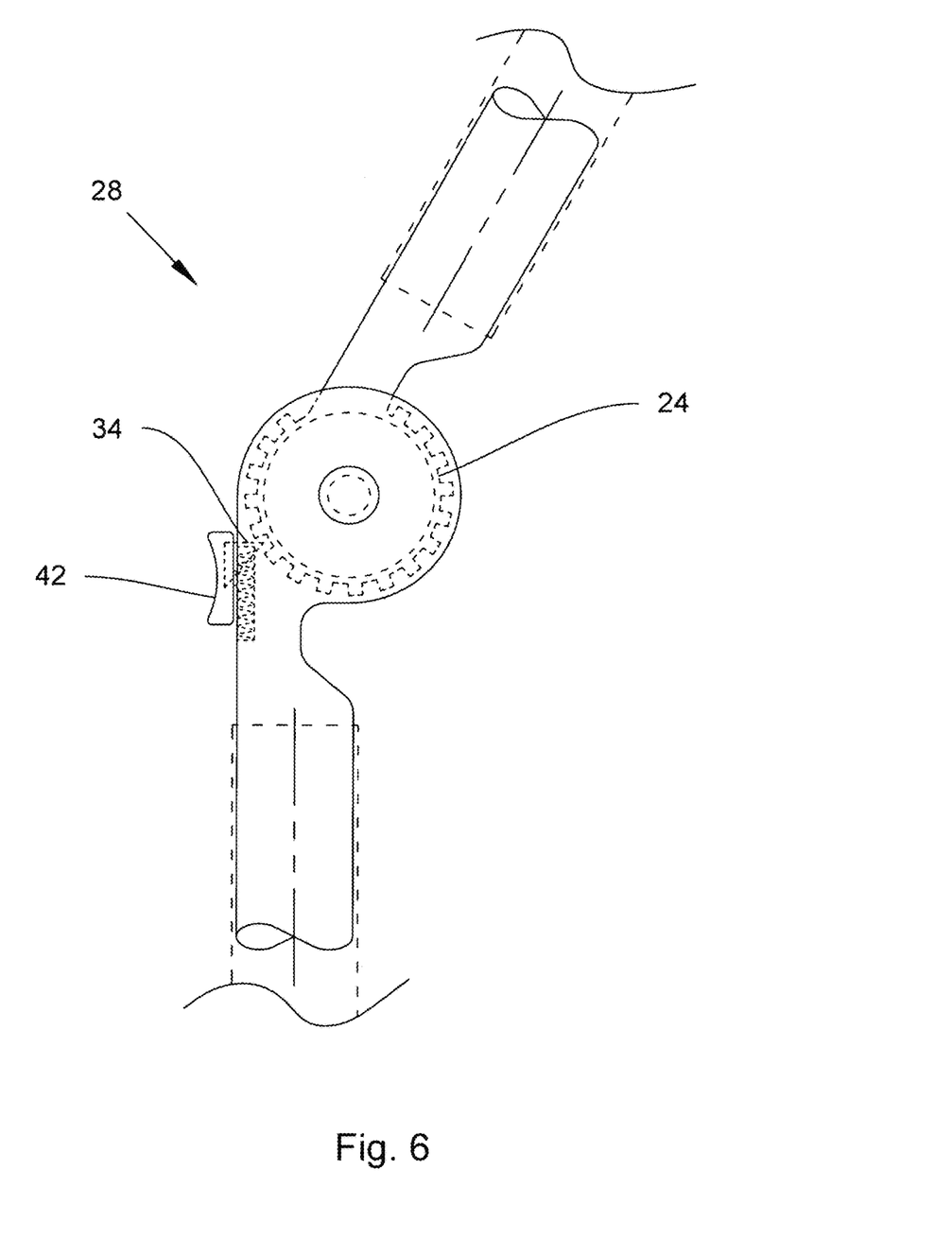
FIG. 6 is a schematic diagram showing a close up and cutaway view of the elbow joint.

The Xtra Arm is comprised of two tubular sections 26. Each tubular section measures approximately twelve inches in total length and one inch in diameter. The two tubular sections 26 are centrally joined together using a circularly shaped rotatable and lockable elbow joint 28 that measures approximately two inches in diameter. The elbow joint 28 contains an internal cogged gear 24 and a metal latch fastener 34 that enables the user to manipulate the two tubular lengths at a variety of angles and then lock the Xtra Arm in position when a desired angle is achieved. A simple push button release 42 is positioned at the base of the latch to permit a user to easily adjust or release the angle of the Xtra Arm as needed.

Figure 7:
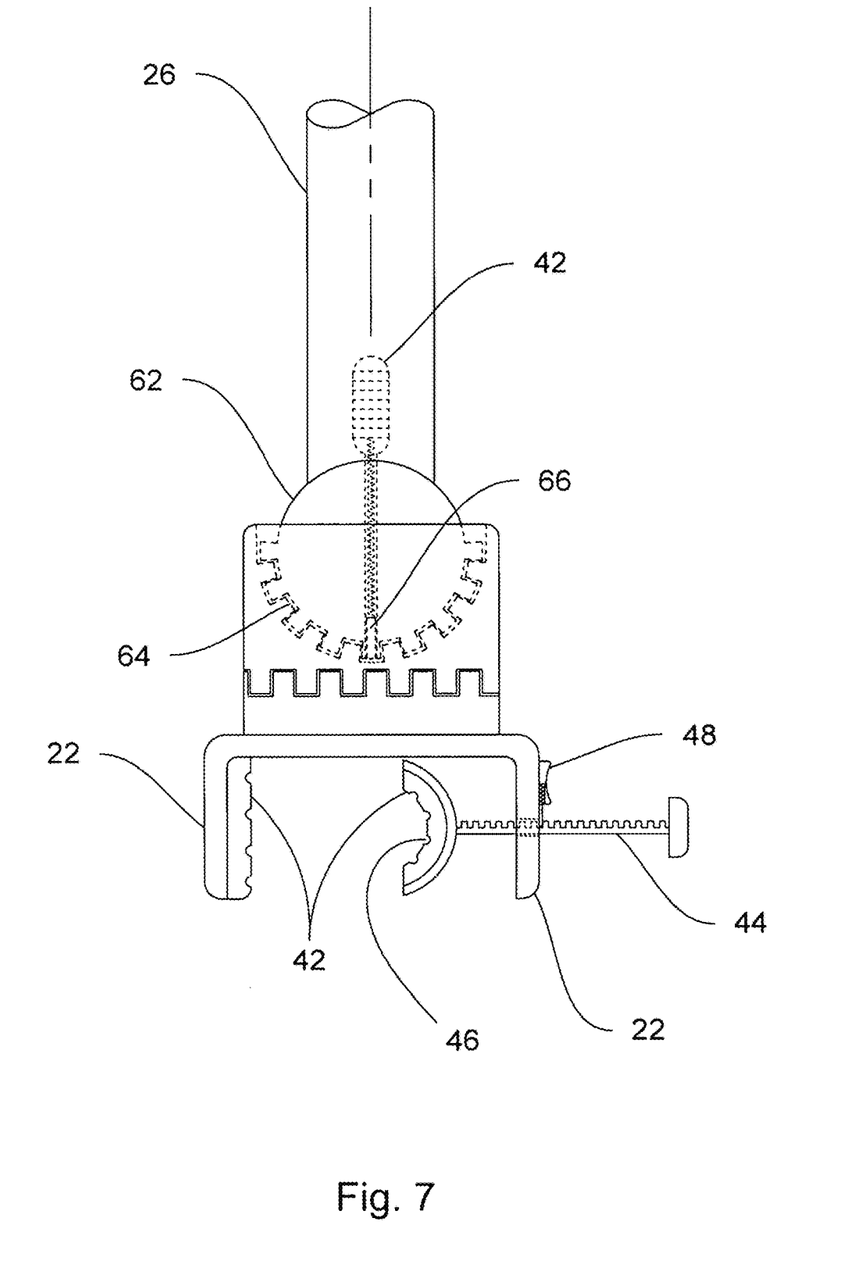
FIG. 7 is a schematic diagram showing a close up and cutaway view of the bottom clamp.

Describing in more detail, the two sturdy clamp fasteners 22, 32 are positioned on each end of the Xtra Arm. Please refer to FIG. 7. Positioned at the bottom end of the Xtra Arm, the first clamp 22 is a fully adjustable tension clamp that is configured for mounting the Xtra Arm to various surfaces. Generally rectangular in shape and lined with rubber 42 to protect delicate surfaces, this tension clamp 22 expands up to approximately two inches in length and is one inch in depth. Running through one end of this clamp 22 is an adjustable tension bar 44 with its distal end containing a curved rubber base 46 plate to abut flush against designated object over which the clamp 22 is attached. An integrated locking latch 46 and release button 48 is included for ratcheting the clamp 22 tightly over a designated surface or object and then locking it into position during use. Immediately above clamp 22 is rotatable and lockable joint 62. Joint 62 is similar in function to elbow joint 28. Specifically, joint 62 contains an internal gear 64, wherein gear 64 is cogged on the lower half of its circumference and a metal latch fastener 66 that enables the user to manipulate the tubular length 26 at a variety of angles relative to the clamp 22 and then lock the Xtra Arm in position when a desired angle is achieved. A simple push button release 68 is positioned above the latch fastener 66 to permit a user to easily adjust or release the angle of the Xtra Arm as needed.

Figure 8:
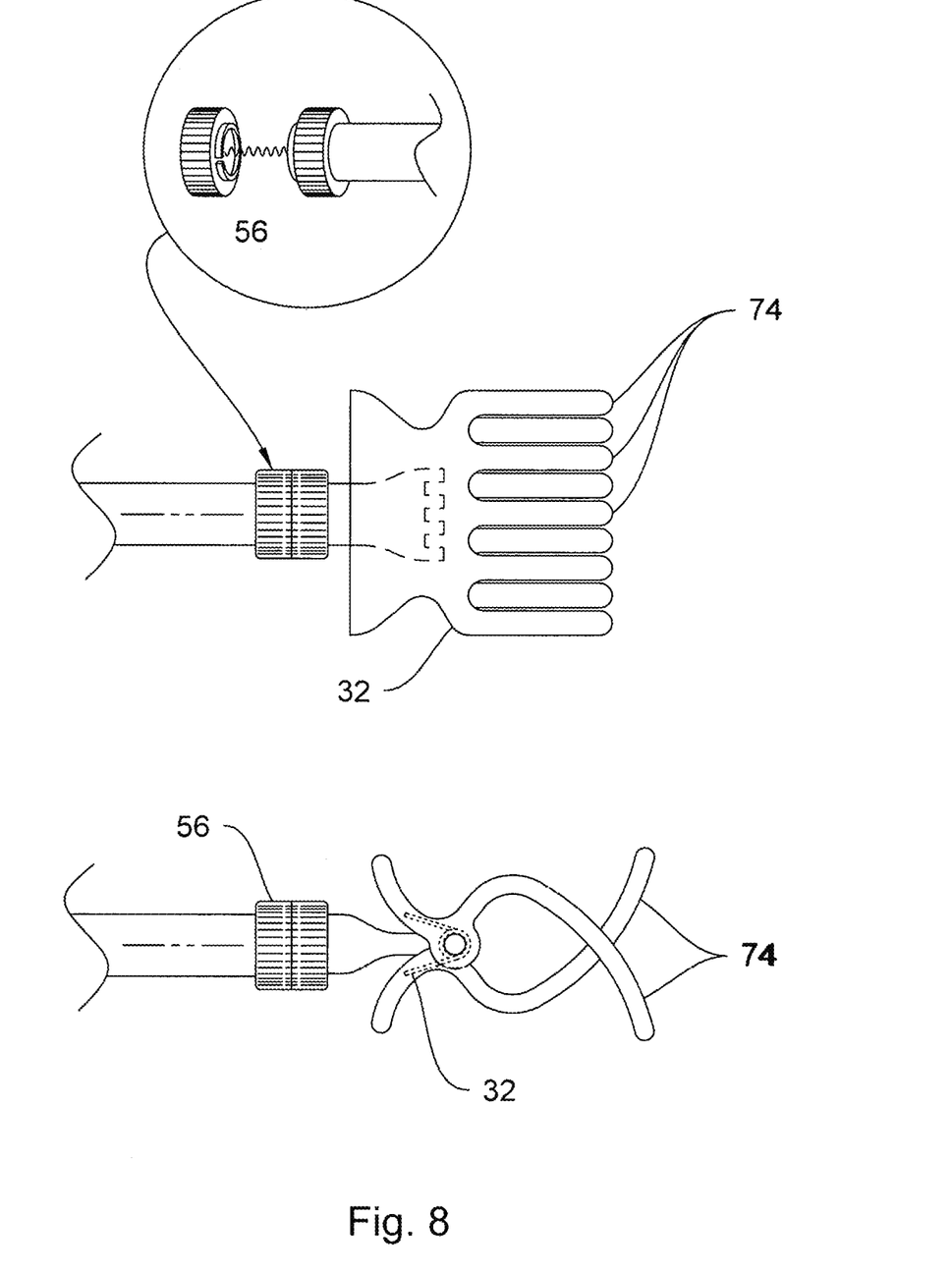
FIG. 8 is a schematic diagram showing a close up and cutaway view of the grasping clamp.

Please refer to FIG. 8. Positioned at the top end of the Xtra Arm, the second clamp 32 is mounted to the arm with a spring loaded, rotating hook mechanism 72 that is hidden within a cylindrical collar 56. This configuration enables the user to adjust the positioning of the attached clamp approximately ninety degrees and then lock that position into place. Clamp 32 comprises two sets of opposing interlocking tines 74. Tines 74 allow grasping of objects by opening the tines 74 of the clamp 32 and closing the tines 74 around the object to be grasped. The clamp is comprised of interlocking, spring loaded jaws comprising tines 74 that expand up to approximately two inches in diameter. Each jaw comprises a series of curved tines that easily grip a variety of items. These tines are coated in nonskid rubber to facilitate a firm grip and protect secured objects. Clamp 32 is connected to the top of arm 26 by a rotatable locking joint 82, that functions in a manner similar to elbow joint 28 and rotatable joint 62.

Application and use of the Xtra Arm is simple and straightforward. The Xtra Arm is easily employed when one wishes to secure a personal item to another object. A mobility walker utilizes the Xtra Arm to secure their purse, a backpack or a few bags of groceries to their walker. A user pushing a shopping cart from a store to their vehicle in pouring rain utilizes the Xtra Arm to secure an open umbrella over their head.

Releasing the rectangular clamp fastener located at the distal end of the present invention, the user secures the fastener to the designated object such as a walker frame, stroller handle or beach chair or the like, adjusting the tension bar to mount the clamp in place. The user adjusts the positioning of the two hinged support arms by manipulating the elbow joint that joins the two arms and then locking the Xtra Arm at a desired angle. The user adjusts the rotatable mechanisms located at the base of each clamp to adjust the individual clamps to accommodate their personal needs.

With the Xtra Arm mounted and adjusted, the user then attaches the designated object they wish to secure to the second clamp fastener located at the proximal end. Opening the spring loaded jaws of the clamp, the user secures the jaws closed about the designated object such as a grocery bag, umbrella handle or fishing pole. Secured using the Xtra Arm, the item remains firmly in place until released by the user. Easily releasable following use, the Xtra Arm is effortlessly applied and removed throughout a day's activities. The compactable and lightweight Xtra Arm is carried or stored in diaper bags, tackle boxes, purses, briefcases or glove compartments. After use, the Xtra Arm is removed, compacted and stored away until again needed.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. An assistive device comprised of an adjustable support arm with an integrated clamp holder that is easily attachable to a surface, comprising:
   an adjustable and lockable first clamp capable of mounting to a surface,
   a first rotatable and lockable rotating joint attached to the first clamp,
   a first arm attached to the first rotatable and lockable first rotating joint,
   a second rotatable and lockable rotating joint attached to the first arm,
   a second arm attached to the second rotatable and lockable second rotating joint,
   a third rotatable and lockable rotating joint attached to the second arm,
   a rotating collar attached to the third rotatable and lockable rotating joint,
   a second clamp comprising two sets of opposing interlocking tines connected to the rotating collar,
   wherein the two sets of opposing interlocking tines are capable of securely grasping an object,
   wherein the first, second and third rotatable and lockable joints are circular and each comprises an internal cogged gear and a metal latch fastener that enables a user to adjust the position of the joint and lock the joint in a desired position, and
   wherein the adjustable and lockable first clamp is positioned at the bottom end of the device, and is a fully adjustable tension clamp that is configured for mounting the device to a surface, and wherein the tension clamp is rectangular in shape and lined with rubber to protect delicate surfaces and the tension clamp expands up to approximately two inches in length and one inch in depth, and further comprising an adjustable tension bar wherein the tension bar runs through one end of the clamp having a distal end containing a curved rubber base plate to abut flush against a designated object over which the clamp is attached, further comprising an integrated locking latch and release button included for ratcheting the clamp tightly over a designated surface or object and then locking it into position during use.

2. The assistive device of claim 1, manufactured with lightweight yet durable aluminum material and comprised of metal and rubber components.

3. The assistive device of claim 1 wherein the arms comprise two tubular sections, wherein each tubular section measures approximately twelve inches in total length and one inch in diameter.

4. The assistive device of claim 1, wherein the second clamp is mounted to the second arm with a spring loaded, rotating hook mechanism that is hidden within a cylindrical collar, allowing the adjustment and locking of the position of the second clamp approximately ninety degrees and then lock that position into place.

5. The assistive device of claim 4, wherein the second clamp comprises two sets of opposing interlocking tines, wherein the tines allow grasping of objects by opening the tines of the clamp and closing the tines around an object to be grasped.

6. The assistive device of claim 5 wherein the clamp is comprised of interlocking, spring loaded jaws comprising tines that expand up to approximately two inches in diameter.

7. The assistive device of claim 6 wherein the tines are curved toward each other and wherein the tines are coated in nonskid rubber to facilitate a firm grip and protect secured objects.

8. An assistive device comprised of an adjustable support arm with an integrated clamp holder that is easily attachable to a surface, comprising:
   an adjustable and lockable first clamp capable of mounting to a surface,
   a first rotatable and lockable rotating joint attached to the first clamp,
   a first arm attached to the first rotatable and lockable first rotating joint,
   a second rotatable and lockable rotating joint attached to the first arm,
   a second arm attached to the second rotatable and lockable second rotating joint,
   a third rotatable and lockable rotating joint attached to the second arm,
   a rotating collar attached to the third rotatable and lockable rotating joint,
   a second clamp comprising two sets of opposing interlocking tines connected to the rotating collar,
   wherein the two sets of opposing interlocking tines are capable of securely grasping an object,
   wherein the first, second and third rotatable and lockable joints each comprise an internal cogged gear and a metal latch fastener that enables a user to adjust the position of the joint and lock the joint in a desired position; and
   wherein the adjustable and lockable first clamp is positioned at the bottom end of the device, and is a fully adjustable tension clamp that is configured for mounting the device to a surface, and further comprising an adjustable tension bar wherein the tension bar runs through one end of the tension clamp having a distal end containing a base plate to abut flush against a designated object over which the clamp is attached, further comprising an integrated locking latch and release button included for ratcheting the clamp tightly over a designated surface or object and then locking it into position during use.

9. The assistive device of claim 8, manufactured with lightweight yet durable aluminum material and comprised of metal and rubber components.

10. The assistive device of claim 8 wherein the arms comprise two tubular sections, wherein each tubular section measures approximately twelve inches in total length and one inch in diameter.

11. The assistive device of claim 8, wherein the second clamp is mounted to the second arm with a spring loaded, rotating hook mechanism that is hidden within a cylindrical collar, allowing the adjustment and locking of the position of the second clamp approximately ninety degrees and then lock that position into place.

12. The assistive device of claim 11, wherein the second clamp comprises two sets of opposing interlocking tines, wherein the tines allow grasping of objects by opening the tines of the clamp and closing the tines around an object to be grasped.

13. The assistive device of claim 12 wherein the clamp is comprised of interlocking, spring loaded jaws comprising tines that expand up to approximately two inches in diameter.

14. The assistive device of claim 13 wherein the tines are curved toward each other and wherein the tines are coated in nonskid rubber to facilitate a firm grip and protect secured objects.

15. The assistive device of claim 8 wherein the first, second and third rotatable and lockable joints are circular.

16. The assistive device of claim 8 wherein the tension clamp is rectangular in shape.

17. The assistive device of claim 8 wherein the tension clamp is lined with rubber to protect delicate surfaces.

18. The assistive device of claim 8 wherein the tension clamp expands up to approximately two inches in length and one inch in depth.

* * * * *